(12) United States Patent
Teramura

(10) Patent No.: US 11,592,663 B2
(45) Date of Patent: Feb. 28, 2023

(54) LIGHT DETECTING APPARATUS AND LIGHT SCANNING APPARATUS

(71) Applicant: CANON KABUSHIKI KAISHA, Tokyo (JP)

(72) Inventor: Masayasu Teramura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/487,454

(22) Filed: Sep. 28, 2021

(65) Prior Publication Data

US 2022/0113536 A1 Apr. 14, 2022

(30) Foreign Application Priority Data

Oct. 8, 2020 (JP) .............................. JP2020-170306

(51) Int. Cl.
| | |
|---|---|
| *G03G 15/043* | (2006.01) |
| *G02B 26/12* | (2006.01) |
| *G02B 26/08* | (2006.01) |
| *G02B 5/122* | (2006.01) |
| *G02B 26/10* | (2006.01) |

(52) U.S. Cl.
CPC ............. *G02B 26/12* (2013.01); *G02B 5/122* (2013.01); *G02B 26/0816* (2013.01); *G02B 26/101* (2013.01); *G03G 15/043* (2013.01)

(58) Field of Classification Search
CPC ................ G02B 5/122; G02B 26/0816; G02B 26/101; G02B 26/12; G02B 26/121; G03G 15/043
See application file for complete search history.

(56) References Cited

U.S. PATENT DOCUMENTS

| | | | |
|---|---|---|---|
| 2016/0131922 A1* | 5/2016 | Nagahara ............. | G02B 17/008 359/434 |
| 2018/0059392 A1* | 3/2018 | Amano ................ | G02B 15/142 |

FOREIGN PATENT DOCUMENTS

| | | |
|---|---|---|
| JP | H05323221 A | 12/1993 |
| JP | H0829603 A | 2/1996 |

\* cited by examiner

*Primary Examiner* — Hoang X Ngo
(74) *Attorney, Agent, or Firm* — Canon U.S.A., Inc. IP Division

(57) ABSTRACT

An apparatus includes a reflecting element with first, second and third reflecting surfaces, and a receiving element configured to receive a light flux from a light source reflected by the reflecting element. A value of an inner product of a unit normal vector of the first reflecting surface and a unit normal vector of the second reflecting surface, a value of an inner product of the unit normal vector of the first reflecting surface and a unit normal vector of the third reflecting surface, and a value of an inner product of the unit normal vector of the second reflecting surface and the unit normal vector of the third reflecting surface are appropriately set.

20 Claims, 7 Drawing Sheets

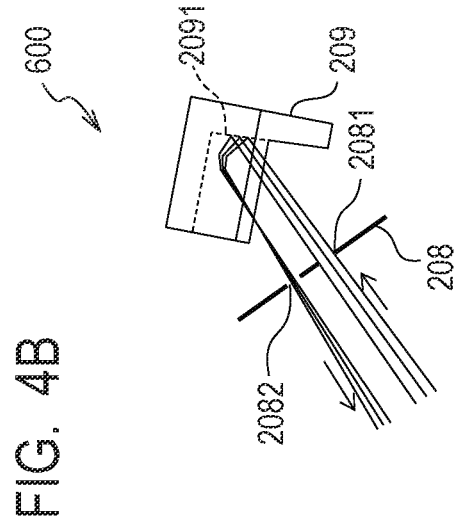
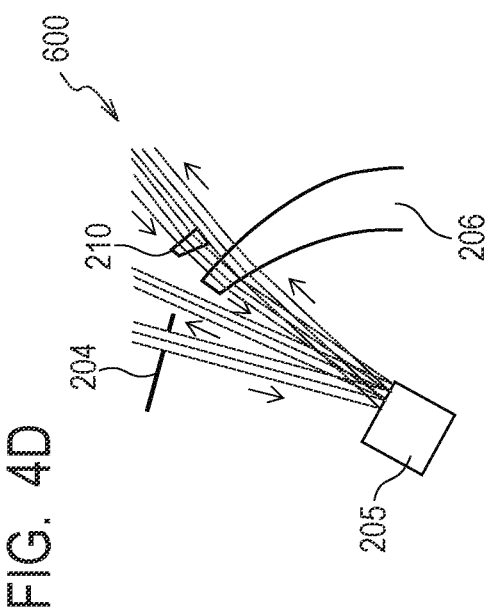
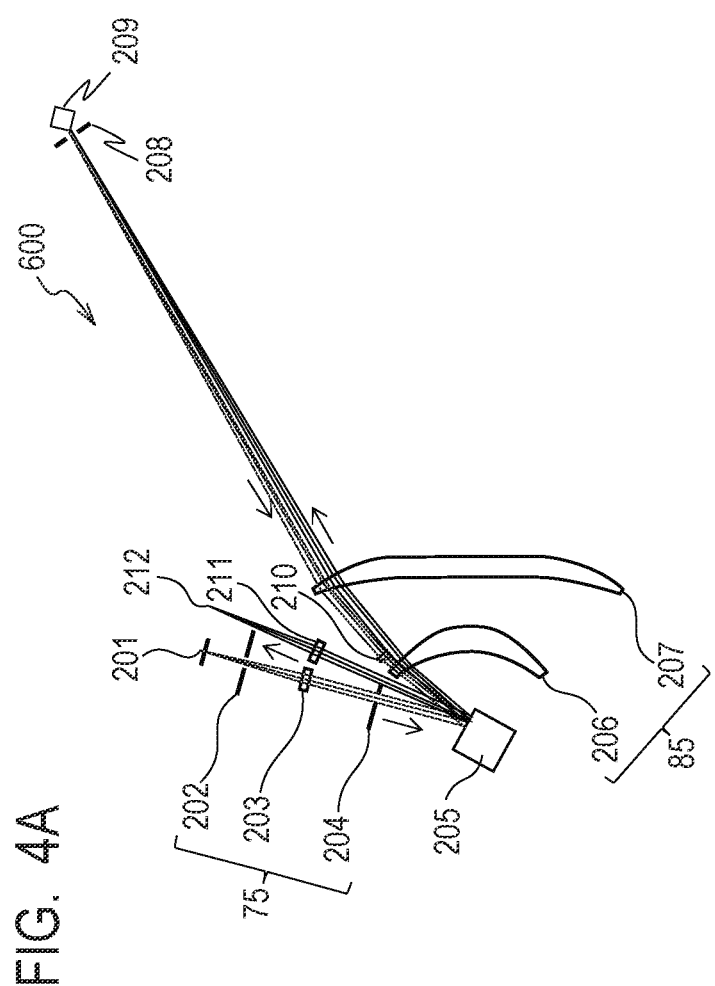
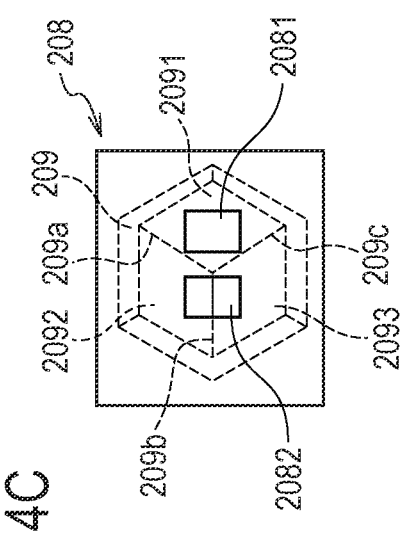

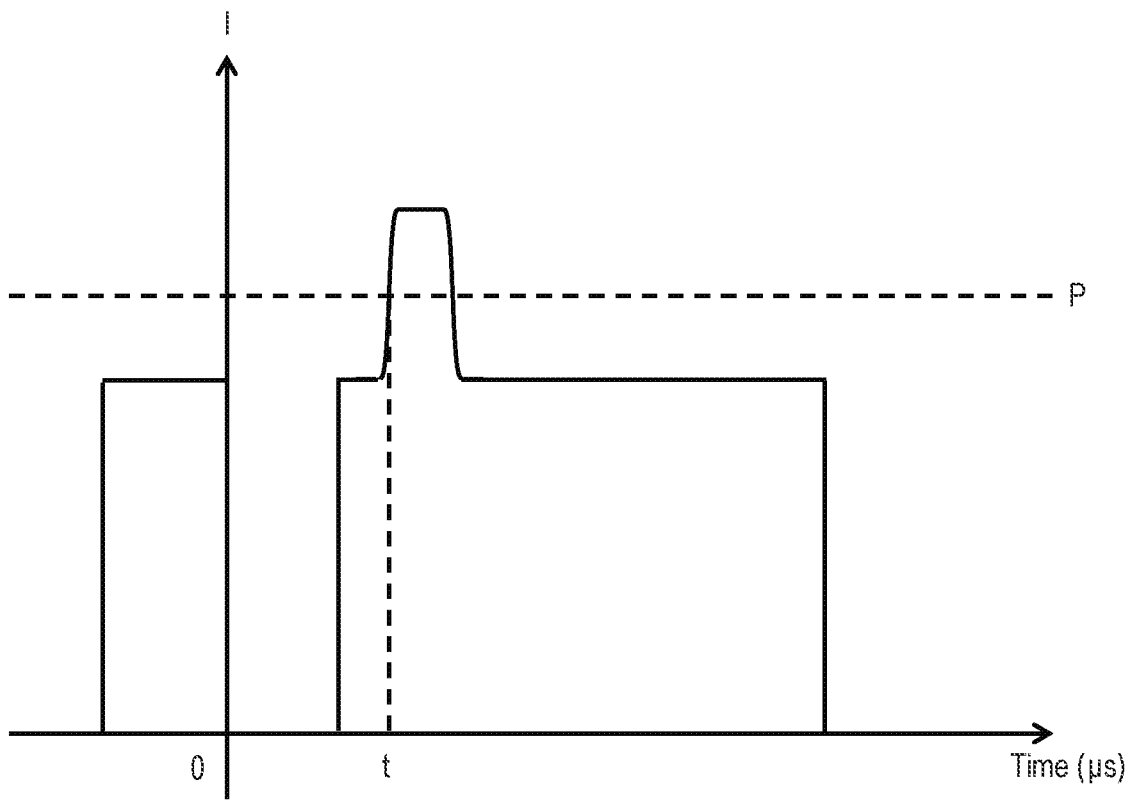

LIGHT DETECTING APPARATUS AND LIGHT SCANNING APPARATUS

BACKGROUND

Field of the Disclosure

The aspect of the embodiments relates to a light detecting apparatus, particularly suitable for a light scanning apparatus.

Description of the Related Art

In recent years, downsizing has been achieved by providing a compact writing position detecting means in a light scanning apparatus.

Japanese Patent Application Laid-Open No. H05-323221 discloses a light scanning apparatus in which a light receiving element provided in a light source can receive a light flux reflected by a planar mirror back to the light source after being deflected by a deflecting unit to detect a writing position.

In the light scanning apparatus disclosed in Japanese Patent Application Laid-Open No. H05-323221, an incident position of the light flux on the light receiving element changes when a posture of the planar mirror changes in accordance with an occurrence of a disturbance, so that a detection accuracy of the writing position deteriorates.

Further, in the light scanning apparatus disclosed in Japanese Patent Application Laid-Open No. H05-323221, a light amount of the light flux when it is incident on the light receiving element decreases since the light flux reflected by the planar mirror passes through a light emitting element in the light source.

SUMMARY OF THE DISCLOSURE

An apparatus according to an aspect of the embodiments includes a reflecting element with first, second and third reflecting surfaces, and a receiving element configured to receive a light flux from a light source reflected by the reflecting element. The apparatus satisfies the following inequalities:

$$0.001 < ||S| - |U|| < 0.1;$$

$$0.001 < ||T| - |U|| < 0.1;$$

and $$0 \leq ||S| - |T|| < 0.1,$$

where S represents a value of an inner product of a unit normal vector of the first reflecting surface and a unit normal vector of the second reflecting surface, T represents a value of an inner product of the unit normal vector of the first reflecting surface and a unit normal vector of the third reflecting surface, and U represents a value of an inner product of the unit normal vector of the second reflecting surface and the unit normal vector of the third reflecting surface.

Further features of the disclosure will become apparent from the following description of exemplary embodiments with reference to the attached drawings.

BRIEF DESCRIPTION OF THE DRAWINGS

FIG. 4A is a main scanning cross-sectional view of a light scanning apparatus according to a second embodiment of the disclosure.

FIG. 4B is an enlarged main scanning cross-sectional view of the light scanning apparatus according to the second embodiment.

FIG. 4C is a front view of an aperture means included in the light scanning apparatus according to the second embodiment.

FIG. 4D is an enlarged main scanning cross-sectional view of the light scanning apparatus according to the second embodiment.

FIG. 6 is a graph illustrating a variation of an output of light received by the light receiving element with time in the light scanning apparatus according to the third embodiment.

DESCRIPTION OF THE EMBODIMENTS

The light detecting apparatus according to the aspect of the embodiments is described in detail below with reference to the accompanying drawings. In order to facilitate understanding of the aspect of the embodiments, the following drawings may be drawn in a scale different from the actual scale.

First Embodiment

Figure 1A:
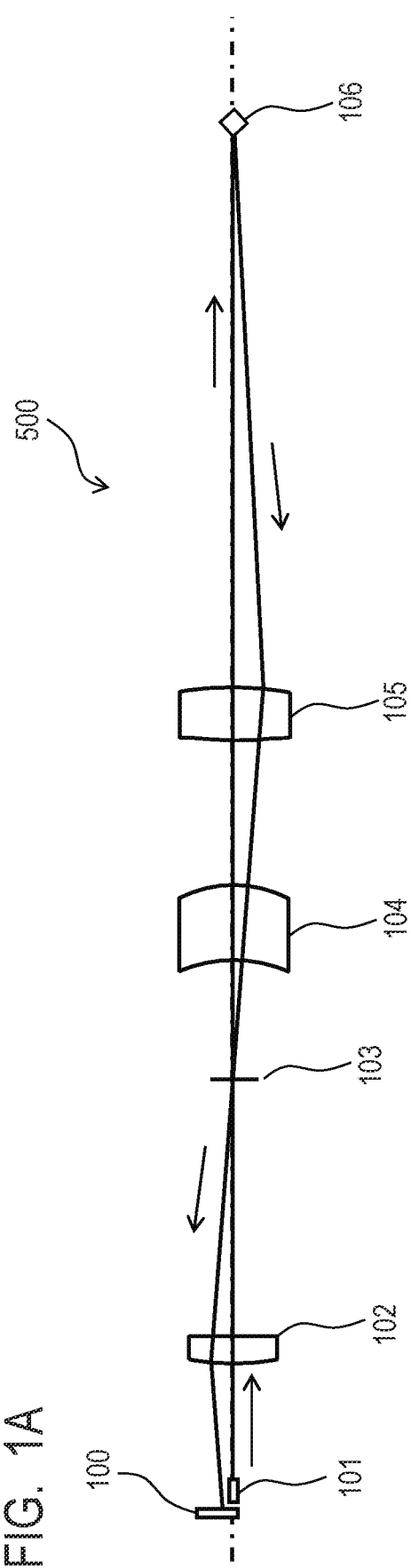
FIG. 1A is a cross-sectional view of a light detecting apparatus according to a first embodiment of the disclosure.
Figure 1C:
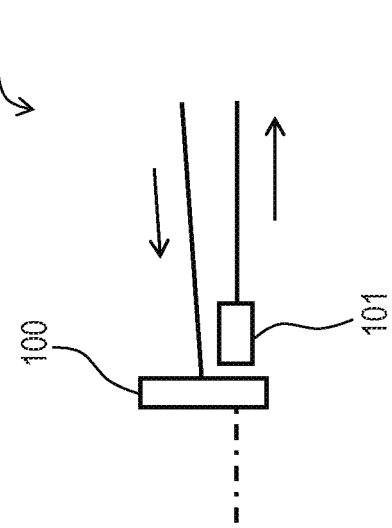
FIG. 1C is an enlarged cross-sectional view of the light detecting apparatus according to the first embodiment.
Figure 1B:
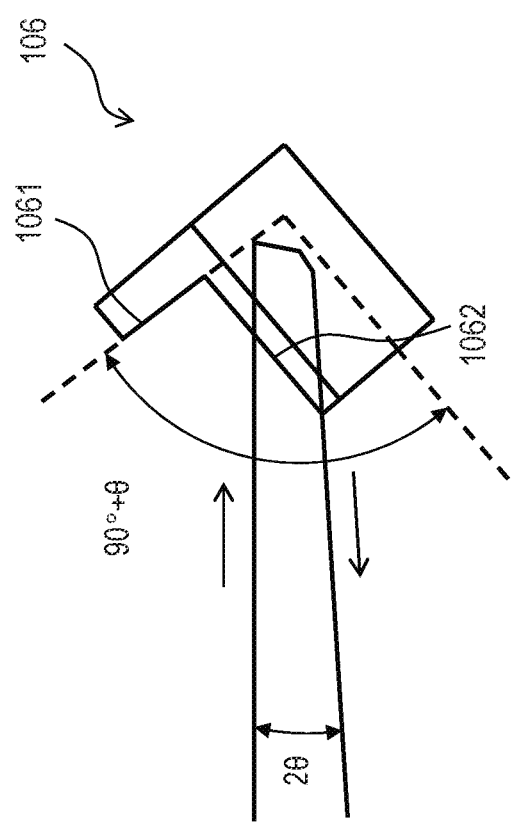
FIG. 1B is an enlarged cross-sectional view of the light detecting apparatus according to the first embodiment.

FIGS. 1A, 1B, and 1C show a cross-sectional view of a main part of a light detecting apparatus 500 according to a first embodiment of the disclosure, an enlarged cross-sectional view of the light detecting apparatus 500 in the vicinity of a reflecting element 106, and an enlarged cross-sectional view of the light detecting apparatus 500 in the vicinity of a light receiving element 100, respectively.

Note that the reflecting element 106 is shown in a projected manner in FIG. 1B.

Figure 2A:
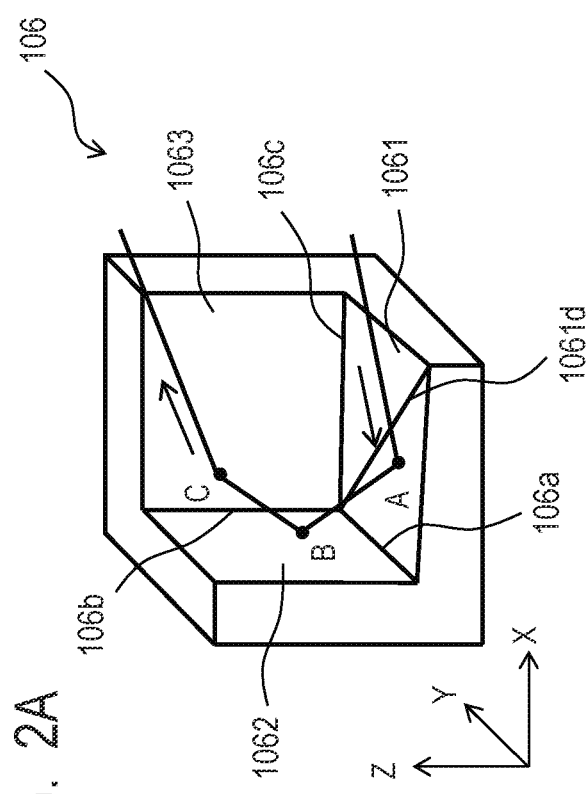
FIG. 2A is a perspective view of a reflecting element included in the light detecting apparatus according to the first embodiment.
Figure 2B:
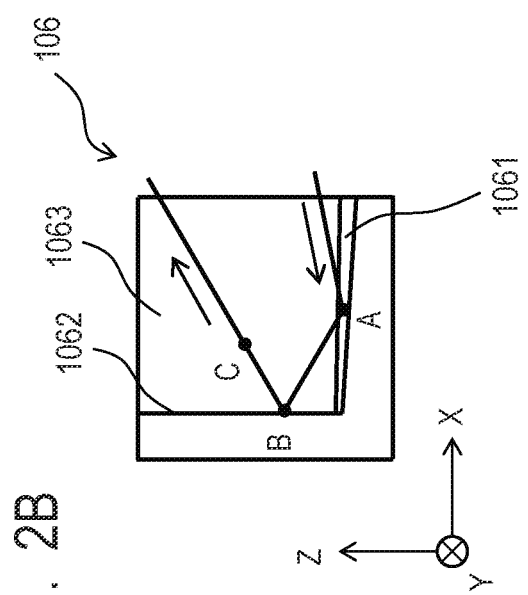
FIG. 2B is a view of the reflecting element included in the light detecting apparatus according to the first embodiment which is projected on an XZ cross section.

FIGS. 2A and 2B show a perspective view a main part of the reflecting element 106 included in the light detecting apparatus 500 according to the present embodiment, and a view of the reflecting element 106 projected on an XZ cross section, respectively.

Figure 2C:
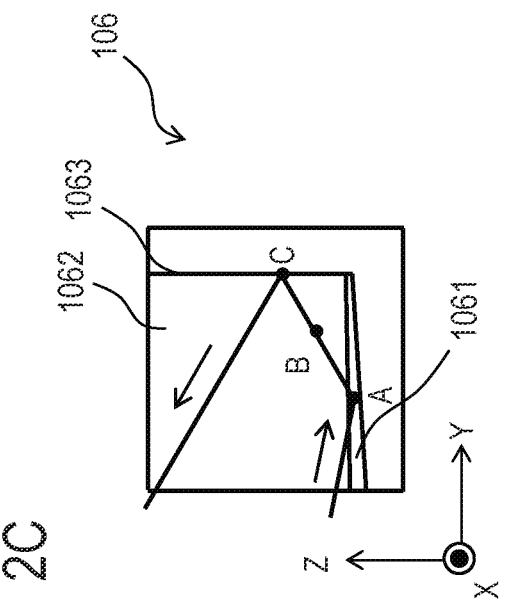
FIG. 2C is a view of the reflecting element included in the light detecting apparatus according to the first embodiment which is projected on a YZ cross section.
Figure 2D:
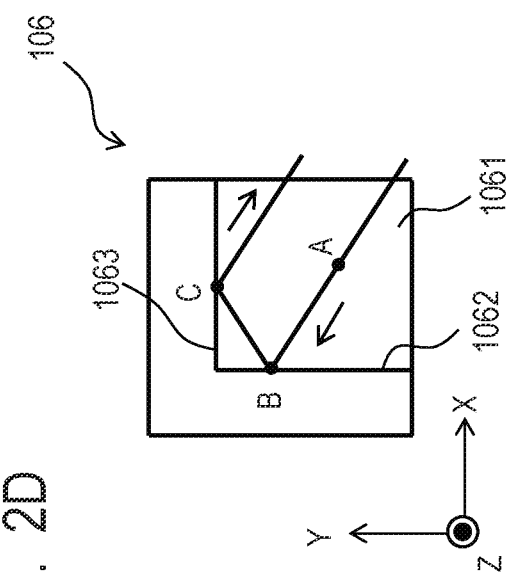
FIG. 2D is a view of the reflecting element included in the light detecting apparatus according to the first embodiment which is projected on an XY cross section.

FIGS. 2C and 2D show a view of the reflecting element 106 included in the light detecting apparatus 500 according to the present embodiment which is projected on a YZ cross section and an XY cross section, respectively.

As shown in FIG. 2A, the reflecting element 106 has a cubic outer shape in which three axes orthogonal to each other are defined as an X-axis, a Y-axis and a Z-axis, respectively, in the light detecting apparatus 500 according to the present embodiment.

Arrows in FIGS. 1A to 1C and FIGS. 2A to 2D indicate a traveling direction of a light flux.

The light detecting apparatus 500 according to the present embodiment includes a light receiving element 100, a light source 101, imaging means 102, 104, 105, and a reflecting element 106.

A photodiode or the like is used as the light receiving element 100, and receives a light flux reflected by the reflecting element 106 as described later. As shown in FIGS. 1A and 1C, the light receiving element 100 is provided at a side opposite to the reflecting element 106 with respect to the light source 101 along an optical path of the light flux.

A semiconductor laser or the like is used as the light source 101, and emits a light flux toward the reflecting element 106.

The imaging means 102 has a finite power (refractive power) in a predetermined cross section (hereinafter referred to as a first cross section) parallel to the paper plane, namely parallel to an optical axis, and condenses the light flux emitted from the light source 101 in the first cross section.

In this way, the light flux emitted from the light source 101 is condensed in the first cross section in the vicinity of a primary imaging point 103.

The imaging means 104 and 105 have a finite power in the first cross section, and condense the light flux having passed through the primary imaging point 103 again in the first cross section.

The reflecting element 106 has the structure shown in FIGS. 2A to 2D. The reflecting element 106 is arranged so as to reflect the light flux having passed through the imaging means 104 and 105 at a different angle from the incident light flux with respect to the optical axis in the first cross section, and at the same angle as the incident light flux with respect to the optical axis in a second cross section parallel to the optical axis and perpendicular to the first cross section.

Specifically, as shown in FIGS. 2A to 2D, the reflecting element 106 has a first reflecting surface 1061, a second reflecting surface 1062 and a third reflecting surface 1063.

The first reflecting surface 1061 and the second reflecting surface 1062 are in contact with each other so as to form a ridge line 106a (first ridge line), and the second reflecting surface 1062 and the third reflecting surface 1063 are in contact with each other so as to form a ridge line 106b (second ridge line).

Further, the third reflecting surface 1063 and the first reflecting surface 1061 are in contact with each other so as to form a ridge line 106c (third ridge line).

As shown in FIG. 2A, the first to third reflecting surfaces 1061 to 1063 form a concave space for reflecting a light flux in the reflecting element 106.

Here, an angle formed by the ridge line 106a with respect to the ridge line 106b is different from 90 degrees, and an angle formed by the ridge line 106c with respect to the ridge line 106b is different from 90 degrees in the reflecting element 106 included in the light detecting apparatus 500 according to the present embodiment. That is, the ridge lines 106a and 106b are not perpendicular to each other, and the ridge lines 106c and 106b are not perpendicular to each other.

Specifically, each of the ridge lines 106a and 106c forms an angle of 91 degrees with respect to the ridge line 106b. On the other hand, the ridge line 106a forms an angle of 90 degrees with respect to the ridge line 106c.

Further, as shown in FIGS. 1B and 2A, an angle of (90+θ) degrees formed by a diagonal line 1061d of the first reflecting surface 1061 with respect to the ridge line 106b is 91.41 degrees.

The light flux incident on the reflecting element 106 after passing through the imaging means 104 and 105 is first reflected at a point A on the first reflecting surface 1061, then reflected at a point B on the second reflecting surface 1062, and finally reflected at a point C on the third reflecting surface 1063.

That is, the light flux incident on the reflecting element 106 is reflected once by each of the first to third reflection surfaces 1061 to 1063.

In this way, traveling directions of the incident light flux and the exit light flux are not parallel to each other in the XZ section shown in FIG. 2B and in the YZ section shown in FIG. 2C, while they are substantially parallel to each other in the XY section shown in FIG. 2D.

In the reflecting element 106, unit vectors $n_{1061}$, $n_{1062}$ and $n_{1063}$ of respective normals of the first reflection surface 1061, the second reflection surface 1062 and the third reflection surface 1063 (hereinafter referred to as a unit normal vector) are represented as shown in the following Table 1.

TABLE 1

|  | X | Y | Z |
| --- | --- | --- | --- |
| $n_{1061}$ | 0.01745 | −0.01745 | 0.99970 |
| $n_{1062}$ | 1.00000 | 0.00000 | 0.00000 |
| $n_{1063}$ | 0.00000 | −1.00000 | 0.00000 |

Accordingly, when an inner product of the unit normal vector $n_{1061}$ of the first reflecting surface 1061 and the unit normal vector $n_{1062}$ of the second reflecting surface 1062 is represented as S, the inner product S is derived as described in the following expression (1):

$$S = n_{1061} \cdot n_{1062} = 0.01745. \tag{1}$$

Further, when an inner product of the unit normal vector $n_{1061}$ of the first reflecting surface 1061 and the unit normal vector $n_{1063}$ of the third reflecting surface 1063 is represented by T, the inner product T is derived as described in the following expression (2):

$$T = n_{1061} \cdot n_{1063} = 0.01745. \quad (2)$$

Similarly, when an inner product of the unit normal vector $n_{1062}$ of the second reflecting surface 1062 and the unit normal vector $n_{1063}$ of the third reflecting surface 1063 is represented by U, the inner product U is derived as described in the following expression (3):

$$U = n_{1062} \cdot n_{1063} = 0. \quad (3)$$

That is, when absolute values of the inner product S, the inner product T and the inner product U are represented by |S|, |T| and |U|, respectively, the following inequalities (4), (5) and (6) are satisfied in the light detecting apparatus 500 according to the present embodiment:

$$0.001 < ||S| - |U|| < 0.1; \quad (4)$$

$$0.001 < ||T| - |U|| < 0.1; \quad (5)$$

and $$0 \le ||S| - |T|| < 0.1. \quad (6)$$

When the value is equal to or larger than the upper limit value in at least one of the inequalities (4), (5) and (6), the light flux reflected by the reflecting element 106 exits in a direction forming an excessively large angle with respect to the traveling direction of the incident light flux, so that it becomes difficult to make the light flux be incident on the light receiving element 100 efficiently.

Further, when the value is equal to or smaller than the lower limit value in at least one of the inequalities (4) and (5), the light flux reflected by the reflecting element 106 exits in a direction forming an excessively small angle with respect to the traveling direction of the incident light flux, so that it becomes difficult to make the light flux be incident on the light receiving element 100 efficiently.

In this way, as shown in FIG. 1B, the light flux exits from the reflecting element 106 in a traveling direction forming an angle 2θ of 2.82 degrees with respect to that of the incident light flux in the first cross section, and being parallel to that of the incident light flux and having an orientation opposite to that of the incident light flux in the second cross section.

Thus, as shown in FIGS. 1A and 1C, the light flux reflected by the reflecting element 106 passes through the imaging means 105, 104 and 102 again, thereby it can be efficiently guided to the light receiving element 100 without being incident on the light source 101.

Further, a reflecting element 116 as shown in FIGS. 3A to 3D may be used in the light detecting apparatus 500 according to the present embodiment.

Figure 3B:
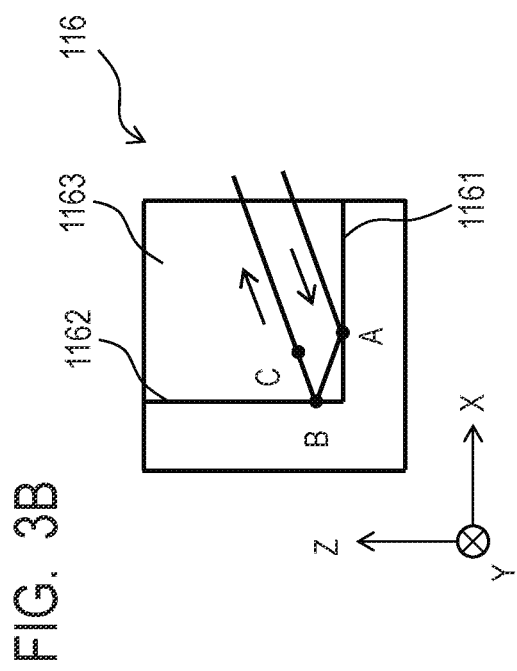
FIG. 3B is a view of the reflecting element included in the light detecting apparatus according to the modified example of the first embodiment which is projected on an XZ cross section.
Figure 3D:
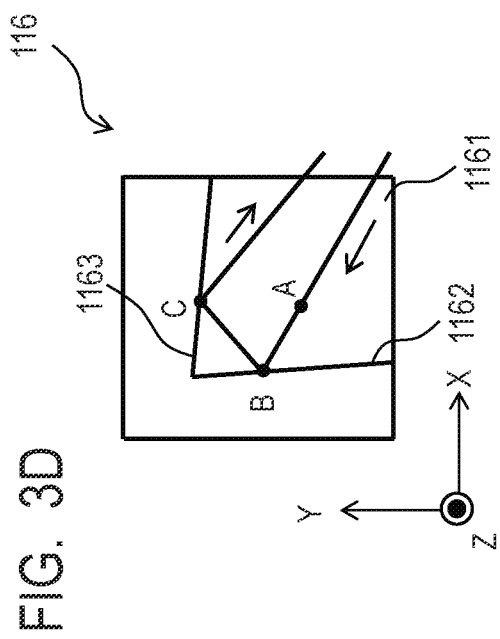
FIG. 3D is a view of the reflecting element included in the light detecting apparatus according to the modified example of the first embodiment which is projected on an XY cross section.
Figure 3A:
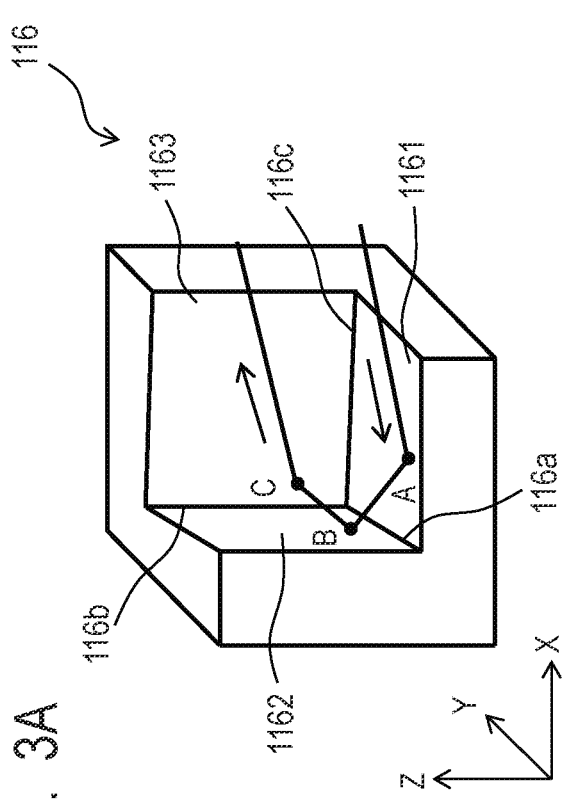
FIG. 3A is a perspective view of a reflecting element included in the light detecting apparatus according to a modified example of the first embodiment.

FIGS. 3A and 3B show a perspective view a main part of the reflecting element 116, and a view of the reflecting element 106 projected on an XZ cross section, respectively.

Figure 3C:
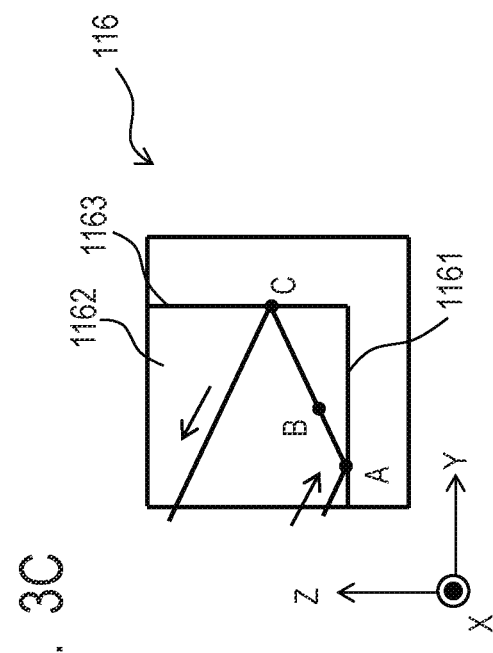
FIG. 3C is a view of the reflecting element included in the light detecting apparatus according to the modified example of the first embodiment which is projected on a YZ cross section.

FIGS. 3C and 3D show a view of the reflecting element 116 projected on a YZ cross section and an XY cross section, respectively.

Specifically, the reflecting element 116 has a first reflecting surface 1161, a second reflecting surface 1162 and a third reflecting surface 1163.

The first reflecting surface 1161 and the second reflecting surface 1162 are in contact with each other so as to form a ridge line 116a, and the second reflecting surface 1162 and the third reflecting surface 1163 are in contact with each other so as to form a ridge line 116b.

Further, the third reflecting surface 1163 and the first reflecting surface 1161 are in contact with each other so as to form a ridge line 116c.

When the reflecting element 116 is arranged in the light detecting apparatus 500 according to the present embodiment, the light flux incident on the reflecting element 116 is first reflected at a point A on the first reflecting surface 1161, then reflected at a point B on the second reflecting surface 1162, and finally reflected at a point C on the third reflecting surface 1163.

Thereby, traveling directions of the incident light flux and the exit light flux are substantially parallel to each other in the XZ section shown in FIG. 3B and in the YZ section shown in FIG. 3C, while they are not parallel to each other in the XY section shown in FIG. 3D.

In the reflecting element 116, unit vectors $n_{1161}$, $n_{1162}$ and $n_{1163}$ of respective normals of the first reflection surface 1161, the second reflection surface 1162 and the third reflection surface 1163 (unit normal vector) are represented as shown in the following Table 2.

TABLE 2

|  | X | Y | Z |
|---|---|---|---|
| $n_{1161}$ | 0.0000 | 0.0000 | 1.0000 |
| $n_{1162}$ | 0.9998 | 0.0196 | 0.0000 |
| $n_{1163}$ | −0.0196 | −0.9998 | 0.0000 |

Accordingly, when an inner product of the unit normal vector $n_{1161}$ of the first reflecting surface 1161 and the unit normal vector $n_{1162}$ of the second reflecting surface 1162 is represented as S, the inner product S is derived as described in the following expression (7):

$$S = n_{1161} \cdot n_{1162} = 0. \quad (7)$$

Further, when an inner product of the unit normal vector $n_{1161}$ of the first reflecting surface 1161 and the unit normal vector $n_{1163}$ of the third reflecting surface 1163 is represented by T, the inner product T is derived as described in the following expression (8):

$$T = n_{1161} \cdot n_{1163} = 0. \quad (8)$$

Similarly, when an inner product of the unit normal vector $n_{1162}$ of the second reflecting surface 1162 and the unit normal vector $n_{1163}$ of the third reflecting surface 1163 is represented by U, the inner product U is derived as described in the following expression (9):

$$U = n_{1162} \cdot n_{1163} = -0.0392. \quad (9)$$

That is, the above-described inequalities (4) to (6) are satisfied in the reflecting element 116.

Further, in one embodiment, the following inequalities (4a), (5a) and (6a) are satisfied in the light detecting apparatus 500 according to the present embodiment:

$$0.005 < ||S| - |U|| < 0.09; \quad (4a)$$

$$0.005 < ||T| - |U|| < 0.09; \quad (5a)$$

and $$0 \le ||S| - |T|| < 0.09. \quad (6a)$$

Furthermore, in another embodiment, the following inequalities (4b), (5b) and (6b) are satisfied in the light detecting apparatus 500 according to the present embodiment:

$$0.008 < ||S| - |U|| < 0.08; \quad (4b)$$

$$0.008 < ||T| - |U|| < 0.08; \quad (5b)$$

and $$0 \le ||S| - |T|| < 0.08. \quad (6b)$$

As described above, by using the reflecting element 106 with the above-described structure, the light flux can be returned to the light receiving element 100 with a high accuracy, even if the posture of the reflecting element 106 changes, in the light detecting apparatus 500 according to the present embodiment.

Thereby, the optical system in the light detecting apparatus 500 can be evaluated with a high accuracy by measuring a variation amount in the light amount of the light flux emitted from the light source 101 caused by passing through the imaging means 102, 104, 105 and the like.

Since the light flux reflected by the reflecting element 106 is made be incident on the light receiving element 100 provided in a predetermined region close to the light source 101 in the light detecting apparatus 500 according to the present embodiment, the angle 20 formed by the traveling direction of the reflected light flux with respect to that of the incident light flux is 6 degrees or less.

Second Embodiment

FIGS. 4A and 4B show main scanning cross-sectional view of a main portion of a light scanning apparatus 600 according to a second embodiment of the disclosure and an enlarged main scanning cross-sectional view of the light scanning apparatus 600 in the vicinity of a reflecting element 209, respectively.

FIG. 4C shows a front view of aperture means 208 included in the light scanning apparatus 600 according to the second embodiment.

FIG. 4D shows an enlarged main scanning cross-sectional view of the light scanning apparatus 600 according to the second embodiment in the vicinity of a deflecting element 210.

Arrows in FIGS. 4A to 4D indicate a traveling direction of a light flux.

In the following description, the main scanning direction is a direction perpendicular to a rotation axis of a deflecting unit and an optical axis of an optical system. The sub-scanning direction is a direction parallel to the rotation axis of the deflecting unit. The main scanning cross section is a cross section perpendicular to the sub-scanning direction. The sub-scanning cross section is a cross section perpendicular to the main scanning direction.

Therefore, in the following description, it should be noted that the main scanning direction and the sub-scanning cross section are different between an incident optical system and a scanning optical system.

The light scanning apparatus 600 according to the present embodiment includes a light source 201, a first aperture stop 202, an anamorphic collimator lens 203 and a second aperture stop 204.

Further, the light scanning apparatus 600 according to the present embodiment includes a deflecting unit 205, a first fθ lens 206, a second fθ lens 207 and aperture means 208.

Furthermore, the light scanning apparatus 600 according to the present embodiment includes a reflecting element 209, a deflecting element 210, an imaging means 211 and a light receiving element 212.

A semiconductor laser or the like is used as the light source 201, and emits a light flux toward the deflecting unit 205.

The first aperture stop 202 limits a diameter of the light flux emitted from the light source 201 in the sub-scanning cross section.

The anamorphic collimator lens 203 converts the light flux having passed through the first aperture stop 202 into a parallel light flux in the main scanning cross section. Here, the parallel light flux includes not only a strict parallel light flux but also a substantially parallel light flux such as a weak divergent light flux and a weak convergent light flux.

Further, the anamorphic collimator lens 203 has a finite power (refractive power) in the sub-scanning cross section, and condenses the light flux having passed through the first aperture stop 202 in the sub-scanning direction.

The second aperture stop 204 limits the diameter of the light flux having passed through the anamorphic collimator lens 203 in the main scanning cross section.

In this way, the light flux emitted from the light source 201 is condensed only in the sub-scanning direction and forms a long line image in the main scanning direction in the vicinity of the deflecting unit 205.

The first aperture stop 202, the anamorphic collimator lens 203 and the second aperture stop 204 form the incident optical system 75 in the light scanning apparatus 600 according to the present embodiment.

The deflecting unit 205 is rotated by a driving unit such as a motor (not shown) to deflect the incident light flux for scanning. The deflecting unit 205 is formed by a polygon mirror, for example.

The first fθ lens 206 (first imaging optical element) and the second fθ lens 207 are anamorphic imaging lenses having different powers between the main scanning cross section and the sub-scanning cross section.

The first fθ lens 206 and the second fθ lens 207 form the scanning optical system (imaging optical system) 85 in the light scanning apparatus 600 according to the present embodiment.

The refractive power in the sub-scanning cross section of the second fθ lens 207 is stronger than the refractive power in the sub-scanning cross section of the first fθ lens 206, namely the strongest in the scanning optical system 85.

In this way, the light flux deflected by the deflecting unit 205 is condensed (guided) and scanned on a scanned surface (not shown) by the scanning optical system 85.

The aperture means 208 limits diameters of the light flux having passed through the first fθ lens 206 and the second fθ lens 207 in the main scanning cross section and the sub-scanning cross section after being deflected in a predetermined direction by the deflecting unit 205.

Specifically, as shown in FIGS. 4B and 4C, a first opening 2081 through which a light flux having passed through the first fθ lens 206 and the second fθ lens 207 passes is formed in the aperture means 208.

Further, a second opening 2082 configured to limit the diameters of the light flux in the main scanning cross section and the sub-scanning cross section by the passing of the light flux reflected by the reflecting element 209 is formed in the aperture means 208, as described later.

The reflecting element 209 has the same structure as the reflecting element 106 shown in FIGS. 2A to 2D.

As shown in FIG. 4B, the reflecting element 209 reflects the light flux having passed through the aperture means 208 in a direction which is different from that of the incident light flux in the main scanning cross section, and being parallel to that of the incident light flux and having an orientation opposite to that of the incident light flux in the sub-scanning cross section.

As shown in FIG. 4D, the deflecting element 210 is a means for changing (deflecting) the traveling direction of a light flux having passed through the second fθ lens 207 again after being reflected by the reflecting element 209, and is formed by an optical element with a wedge shape, for example. In other words, an incident surface and an exit surface of the deflecting element 210 are not parallel to each other in the main scanning cross section.

The deflecting element 210 is provided between the deflecting unit 205 and the scanned surface in the optical axis direction of the scanning optical system 85. An apex angle of the deflecting element 210 is set to 10 degrees.

The imaging means 211 is a means for condensing the light flux deflected again by the deflecting unit 205 after passing through the deflecting element 210 and the first fθ lens 206 in the vicinity of the light receiving element 212, and is formed by a convex lens, for example.

The light receiving element 212 is a light receiving element for receiving the light flux having passed through the imaging means 211, and is formed by a photodiode, for example.

That is, the light flux reflected by the reflecting element 209 can be made to be incident on the light receiving element 212 via the deflecting unit 205 in the light scanning apparatus 600 according to the present embodiment.

Further, the light receiving element 212 is provided between the deflecting unit 205 and the scanned surface in the optical axis direction of the scanning optical system 85 in the light scanning apparatus 600 according to the present embodiment.

FIG. 4C also shows a reflecting element 209 projected on a cross section parallel to the aperture means 208.

The reflecting element 209 has a first reflecting surface 2091, a second reflecting surface 2092 and a third reflecting surface 2093.

The first reflecting surface 2091 and the second reflecting surface 2092 are in contact with each other so as to form a ridge line 209a, and the second reflecting surface 2092 and the third reflecting surface 2093 are in contact with each other so as to form a ridge line 209b.

Further, the third reflecting surface 2093 and the first reflecting surface 2091 are in contact with each other so as to form a ridge line 209c.

The light flux incident on the reflecting element 209 is first reflected by the first reflecting surface 2091, then reflected by the second reflecting surface 2092, and finally reflected by the third reflecting surface 2093.

Each of the ridge lines 209a and 209c forms an angle of 91 degrees with respect to the ridge line 209b in the light scanning apparatus 600 according to the present embodiment.

By designing the reflecting element 209 as described above, the light flux reflected by each reflecting surface of the reflecting element 209 travels in a direction forming an angle with respect to that of the incident light flux.

Further, the reflecting element 209 is arranged such that the first reflecting surface 2091 is closer to the optical axis of the scanning optical system 85 than the second reflecting surface 2092 in the main scanning cross section in the light scanning apparatus 600 according to the present embodiment.

Thus, the light flux reflected by the reflecting element 209 can be guided to respective end portions in the main scanning direction of the first fθ lens 206 and the second fθ lens 207, so that the light flux can be efficiently guided to the light receiving element 212 without being incident on the light source 201.

As described above, by using the reflecting element 209 with the above-described structure, the light flux can be returned to the light receiving element 212 with a high accuracy, even if the posture of the reflecting element 209 changes, in the light scanning apparatus 600 according to the present embodiment.

Thereby, the optical system in the light scanning apparatus 600 can be evaluated with a high accuracy by measuring a variation amount in the light amount of the light flux emitted from the light source 101 caused by passing through the incident optical system 75 and the scanning optical system 85.

Third Embodiment

Figure 5A:
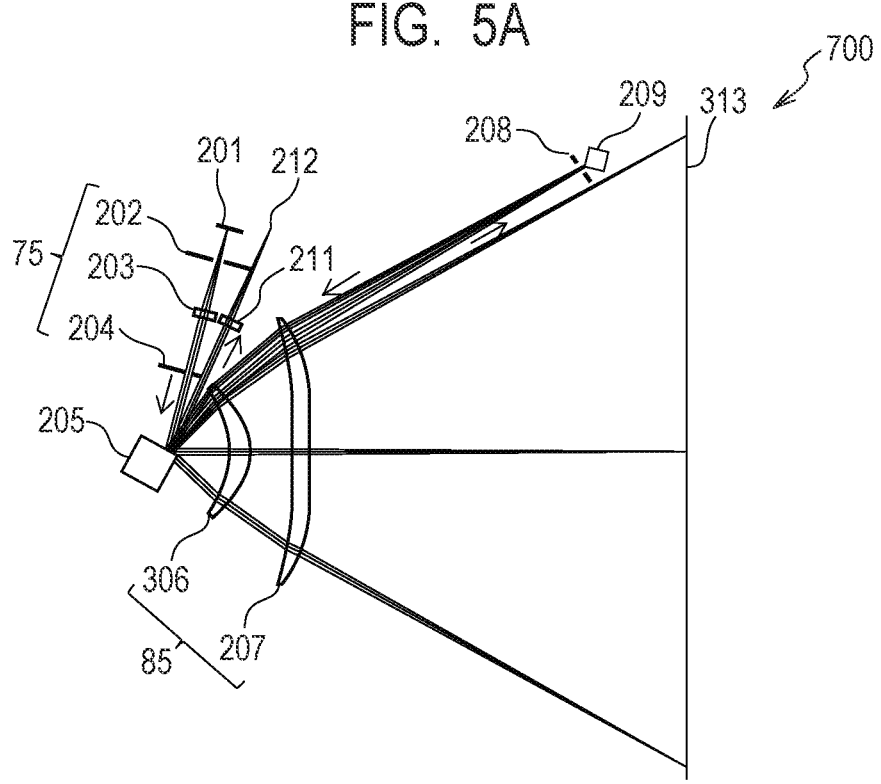
FIG. 5A is a main scanning cross-sectional view of a light scanning apparatus according to a third embodiment of the disclosure.
Figure 5B:
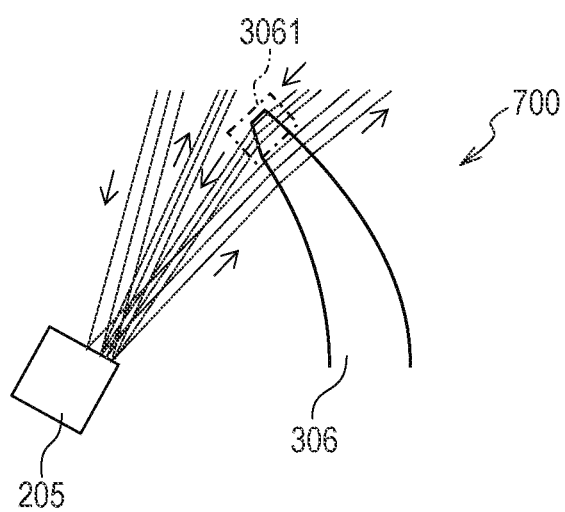
FIG. 5B is an enlarged main scanning cross-sectional view of the light scanning apparatus according to the third embodiment.

FIGS. 5A and 5B show a main scanning cross-sectional view of the light scanning apparatus 700 according to a third embodiment of the disclosure and an enlarged main scanning cross-sectional view of the light scanning apparatus 700 in the vicinity of a first fθ lens 306, respectively.

Figure 5C:
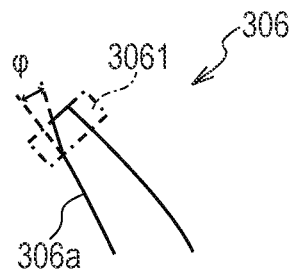
FIG. 5C is an enlarged main scanning cross-sectional view of the light scanning apparatus according to the third embodiment.

Further, FIG. 5C shows an enlarged main scanning cross-sectional view of the light scanning apparatus 700 according to the third embodiment in the vicinity of an end portion of the first fθ lens 306.

The light scanning apparatus 700 according to the present embodiment has the same structure as the light scanning apparatus 600 according to the second embodiment except that the first fθ lens 306 is provided in place of the first fθ lens 206 and the deflecting element 210, so that the same members are denoted by the same reference numerals and description thereof is omitted.

Arrows in FIGS. 5A and 5B indicate a traveling direction of a light flux.

In the light scanning apparatus 700 according to the present embodiment, the first fθ lens 306 (first imaging optical element) has a function of guiding the light flux deflected by the deflecting unit 205 onto the scanned surface 313, and a function of changing the traveling direction of the light flux having passed through the second fθ lens 207 again after being reflected by the reflecting element 209.

Specifically, the first fθ lens 306 is an anamorphic imaging lens having different powers between the main scanning cross section and the sub-scanning cross section in a region through which a light flux for scanning the scanned surface 313 passes.

The light flux deflected by the deflecting unit 205 is condensed (guided) on the scanned surface 313, such as a photosensitive drum, and the scanned surface 313 is scanned in the main scanning direction by the deflecting unit 205.

Further, the first fθ lens 306 has a deflecting portion 3061 in a region different from the region through which the light flux for scanning the scanned surface 313 passes, namely at one end in the main scanning direction.

The light flux having passed through the second fθ lens 207 again after being deflected by the reflecting element 209 is deflected by the deflecting portion 3061.

That is, the deflecting element for changing the traveling direction of the light flux reflected by the reflecting element 209 is integrally formed with the first fθ lens 306 in the light scanning apparatus 700 according to the present embodiment.

The first fθ lens 306 and the second fθ lens 207 form the scanning optical system 85 in the light scanning apparatus 700 according to the present embodiment.

The refractive power in the sub-scanning cross section of the second fθ lens 207 is stronger than the refractive power in the sub-scanning cross section of the first fθ lens 306, namely the strongest in the scanning optical system 85.

As shown in FIG. 5B, the deflecting portion 3061 of the first fθ lens 306 has a shape for deflecting a light flux from the reflecting element 209 toward the optical axis of the scanning optical system 85 in the main scanning cross section to make the light flux be incident on the deflecting unit 205 in the light scanning apparatus 700 according to the present embodiment.

Thereby, the light flux can be guided to the light receiving element 212 disposed between the light source 201 and the reflecting element 209 in the main scanning cross section.

Further, as shown in FIG. 5C, the deflecting portion 3061 of the first fθ lens 306 has a shape in which a thickness thereof decreases from an inner end to an outer end in the main scanning direction.

A portion corresponding to the deflecting unit 3061 in the optical surface 306a at the deflecting unit 205 side of the first fθ lens 306 is inclined by an angle tri with respect to an inclination at an end at the deflecting unit 3061 side of the remaining portion (namely, a portion contributing to imaging) in the main scanning section including the optical axis.

Note that the angle φ is set to 18 degrees in the light scanning apparatus 700 according to the present embodiment.

Further, since the reflecting element 209 is arranged between the deflecting unit 205 and the scanned surface 313 in the optical axis direction, it is possible to guide the light flux to the light receiving element 212 with a higher accuracy by giving a convex power to the deflecting portion 3061.

FIG. 6 shows a variation of an output of light received by the light receiving element 212 with time in the light scanning apparatus 700 according to the present embodiment.

The light receiving element 212 always receives light in a predetermined amount while the light source 201 emits light in the light scanning apparatus 700 according to the present embodiment.

A position corresponding to a reference of a rotational phase of the deflecting unit 205 can be determined by a synchronization detection by synchronization detection means (not shown) to determine a reference time (0 microsecond) in the light scanning apparatus 700 according to the present embodiment.

Further, at a predetermined time, the light flux deflected in a predetermined direction by the deflecting unit 205 is incident on the reflecting element 209, and then the light flux reflected by the reflecting element 209 returns to the light receiving element 212 by being deflected again by the deflecting unit 205 as described above.

Therefore, as shown in FIG. 6, the output of light returning from the reflecting element 209 to the light receiving element 212 at the predetermined time is superimposed in addition to the output of light being received at all times in the output I of the light receiving element 212.

At this time, the time at which the light flux reflected by the reflecting element 209 returns to the light receiving element 212 can be determined as t (microseconds) by setting the threshold value P as shown in FIG. 6.

Thereby, the position of the aperture means 208 can be derived from the time t (microsecond) and a scanning speed V (mm/s) of the deflecting unit 215.

That is, a control unit (not shown) can calculate a time period between the light receptions based on a timing at which the light flux is received by the synchronization detection means (not shown) (i.e., time 0) and a timing at which the light flux is received by the light receiving element 212 (i.e., time t) in the light scanning apparatus 700 according to the present embodiment.

Thereby, it is possible to detect a change in an imaging position of the scanning optical system 85 caused by a temperature increase or the like, for example.

A light emission timing of the light source 201 can be adjusted based on the calculated time period.

As described above, by using the reflecting element 209 with the above-described structure, the light flux can be returned to the light receiving element 212 with a high accuracy, even if the posture of the reflecting element 209 changes, in the light scanning apparatus 700 according to the present embodiment.

Thereby, the scanning timing on the scanned surface 313 can be adjusted with a high accuracy to perform printing with a high accuracy.

Although the exemplary embodiments have been described above, the disclosure is not limited to these embodiments, and various modifications and changes can be made within a scope of a gist thereof.

For example, the reflecting element for reflecting the light flux on the outer surface is used in the apparatuses according to the first to third embodiments, but the disclosure is not limited to this, and the same effect can be obtained by using a reflecting element for totally reflecting the light flux on an inner surface.

Further, the anamorphic collimator lens is used in the apparatuses according to the first to third embodiments, but the disclosure is not limited to this, and the same effect can be obtained by using an optical system in which a collimator lens and a cylindrical lens are provided.

Furthermore, the reflecting element according to the present embodiment described above can be used in optical apparatuses other than the light detecting apparatus and the light scanning apparatus.

According to the aspect of the embodiments, it is possible to provide a light detecting apparatus including a reflecting element capable of suppressing changes in the incident position and the light amount of the light flux in the light receiving element even when the posture of the reflecting element is changed.

[Monochrome Image Forming Apparatus]

Figure 7B:
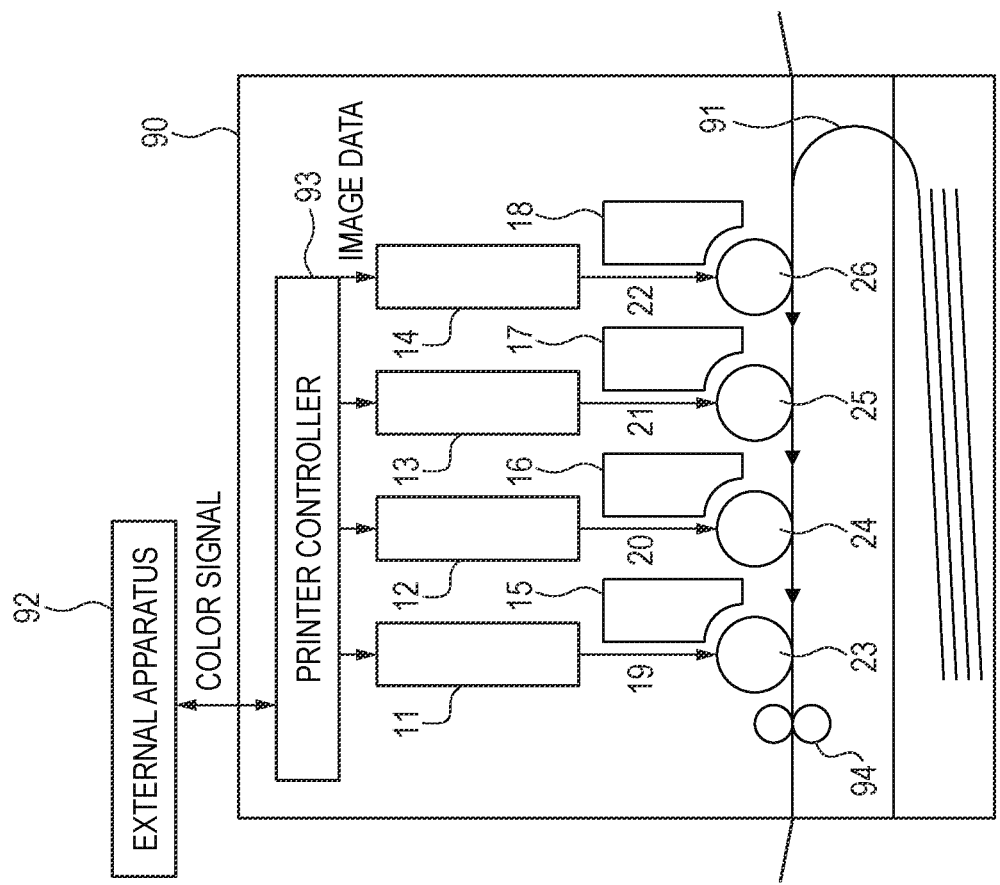
FIG. 7B is a sub-scanning cross-sectional view of a main portion of a color image forming apparatus according to an embodiment of the disclosure.
Figure 7A:
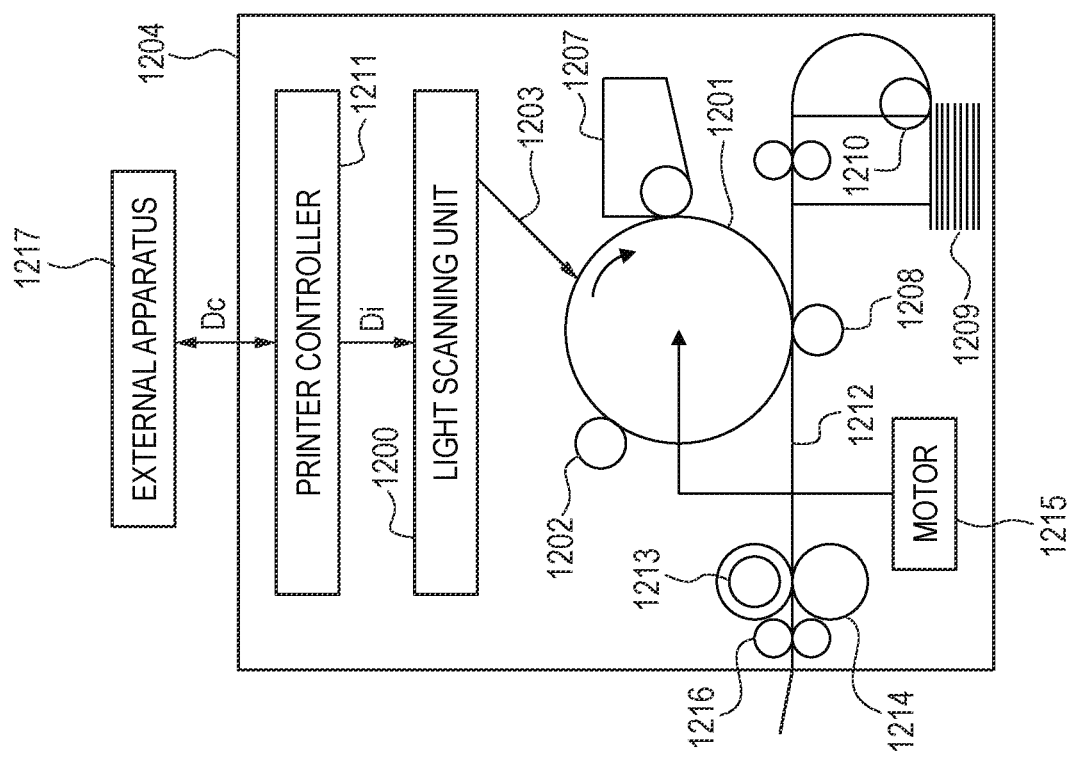
FIG. 7A is a sub-scanning cross-sectional view of a main portion of a monochrome image forming apparatus according to an embodiment of the disclosure.

FIG. 7A shows a sub-scanning cross sectional view of a main part of an image forming apparatus 1204 including the light scanning apparatus according to any one of the second and third embodiments.

As shown in FIG. 7A, code data Dc is input to the image forming apparatus 1204 from an external apparatus 1217, such as a personal computer.

The input code data Dc is converted into image data (dot data) Di by a printer controller 1211 in the apparatus.

Next, the converted image data Di is input to a light scanning unit 1200 which is the light scanning apparatus according to any one of the second and third embodiments.

A light beam 1203 modulated in accordance with the image data Di is emitted from the light scanning unit 1200, and a photosensitive surface of a photosensitive drum 1201 is scanned in the main scanning direction by the light beam 1203.

The photosensitive drum 1201 serving as an electrostatic latent image carrier (photosensitive body) is rotated clockwise by a motor 1215 as shown in FIG. 7A.

With this rotation, the photosensitive surface of the photosensitive drum 1201 moves in the sub-scanning direction perpendicular to the main scanning direction with respect to the light flux 1203.

Further, a charging roller 1202 for uniformly charging the surface of the photosensitive drum 1201 is provided above the photosensitive drum 1201 so as to abut on the surface.

The surface of the photosensitive drum 1201 charged by the charging roller 1202 is irradiated with the light beam 1203 scanned by the light scanning unit 1200.

As described above, the light beam 1203 is modulated based on the image data Di, and an electrostatic latent image is formed on the surface of the photosensitive drum 1201 by irradiating the light beam 1203.

Then, the formed electrostatic latent image is developed as a toner image by a developing unit 1207 arranged on a further downstream side in the rotational direction of the irradiated position of the light beam 1203 on the photosensitive drum 1201 so as to abut on the photosensitive drum 1201.

Next, the toner image developed by the developing unit 1207 is transferred onto a sheet 1212 as a transferred material by a transferring roller 1208 arranged below the photosensitive drum 1201 so as to face the photosensitive drum 1201.

Although the sheet 1212 is stored in a sheet cassette 1209 in front of the photosensitive drum 1201 (right side in FIG. 7A), the sheet 1212 can be manually fed.

A sheet feeding roller 1210 is arranged at an end portion of the sheet cassette 1209, and the sheet 1212 in the sheet cassette 1209 is fed to a conveying path.

The sheet 1212 onto which the unfixed toner image has been transferred as described above is conveyed to a fixing unit arranged behind the photosensitive drum 1201 (left side in FIG. 7A).

The fixing unit is formed by a fixing roller 1213 having a fixing heater (not shown) therein, and a pressing roller 1214 arranged so as to press against the fixing roller 1213.

The unfixed toner image on the sheet 1212 is fixed by heating the sheet 1212 conveyed from the transferring roller 1208 with pressing the sheet 1212 by a pressing portion between the fixing roller 1213 and the pressing roller 1214.

Further, a discharging roller 1216 is arranged behind the fixing roller 1213, and the fixed sheet 1212 is discharged to an outside of the image forming apparatus 1204.

Although not shown in FIG. 7A, the printer controller 1211 controls each member in the image forming apparatus 1204 such as the motor 1215, and a polygon motor in the light scanning unit 1200 or the like in addition to the above-described data conversion.

[Color Image Forming Apparatus]

FIG. 7B shows a sub-scanning cross sectional view of a main part of an image forming apparatus 90 including the light scanning apparatus according to any one of the second and third embodiments.

The image forming apparatus 90 is a tandem type color image forming apparatus in which each of four light scanning apparatuses records image information on a photosensitive drum surface as an image carrier in parallel.

The image forming apparatus 90 includes light scanning apparatuses 11, 12, 13 and 14 each of which has the same structure as the light scanning apparatus according to any one of the second and third embodiments, and photosensitive drums 23, 24, 25 and 26 as image carriers.

Further, the image forming apparatus 90 includes developing units 15, 16, 17 and 18, a conveying belt 91, a printer controller 93, and a fixing unit 94.

As shown in FIG. 7B, R (red), G (green) and B (blue) color signals are input to the image forming apparatus 90 from an external apparatus 92, such as a personal computer.

The input color signals are converted into image data (dot data) of C (cyan), M (magenta), Y (yellow) and K (black) by the printer controller 93 in the apparatus.

The converted image data are input to the light scanning apparatuses 11, 12, 13 and 14.

Light beams 19, 20, 21 and 22 modulated in accordance with the respective image data are emitted from the light scanning apparatuses 11, 12, 13 and 14, and photosensitive surfaces of the photosensitive drums 23, 24, 25 and 26 are scanned in the main scanning direction by the light beams 19, 20, 21 and 22.

Charging rollers (not shown) for uniformly charging the respective surfaces of the photosensitive drums 23, 24, 25 and 26 are provided so as to abut on the surfaces of the photosensitive drums 23, 24, 25, and 26.

The surfaces of the photosensitive drums 23, 24, 25 and 26 charged by the charging rollers are irradiated with the light beams 19, 20, 21 and 22 by the light scanning apparatuses 11, 12, 13, and 14.

As described above, the light beams 19, 20, 21 and 22 are modulated based on image data of each color, and an electrostatic latent image is formed on the respective surfaces of the photosensitive drums 23, 24, 25 and 26 by irradiating the light beams 19, 20, 21 and 22.

Then, each of the formed electrostatic latent images is developed as a toner image by the developing units 15, 16, 17 and 18 arranged so as to abut on the photosensitive drums 23, 24, 25 and 26.

Next, the toner images developed by the developing units 15, 16, 17 and 18 are multiply transferred onto a sheet (transferred material) (not shown) conveyed on a conveying belt 91 by transferring rollers (transferring units) (not shown) arranged so as to face the photosensitive drums 23, 24, 25 and 26, thereby one full color image is formed.

The sheet onto which the unfixed toner image has been transferred is further conveyed to a fixing unit 94 provided behind the photosensitive drums 23, 24, 25 and 26 (left side in FIG. 7B).

The fixing unit 94 is formed by a fixing roller having a fixing heater (not shown) therein, and a pressing roller arranged so as to press against the fixing roller.

The unfixed toner image on the sheet is fixed by heating the sheet conveyed from the transferring unit with pressing the sheet by the pressing portion between the fixing roller and the pressing roller.

Further, a paper discharging roller (not shown) is arranged behind the fixing device 94, and the paper discharging roller discharges the fixed sheet to an outside of the image forming apparatus 90.

Four light scanning apparatuses 11, 12, 13 and 14 corresponding to respective colors of C (cyan), M (magenta), Y (yellow) and K (black) are arranged in the image forming apparatus 90.

In the image forming apparatus 90, each of the four light scanning apparatuses 11, 12, 13 and 14 can record an image signal (image information) on the respective photosensitive surfaces of the photosensitive drums 23, 24, 25 and 26 in parallel to print a color image at a high speed.

As the external apparatus 92, for example, a color image reading apparatus including a charge coupled device (CCD) sensor may be used.

In this case, a color digital copier is formed by this color image reading apparatus and the image forming apparatus 90.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-170306, filed Oct. 8, 2020, which is hereby incorporated by reference herein in its entirety.

What is claimed is:

1. An apparatus comprising:
a reflecting element having first, second and third reflecting surfaces; and
a receiving element configured to receive a light flux from a light source reflected by the reflecting element,
wherein the following inequalities are satisfied:

$$0.001 < \||S| - |U|\| < 0.1;$$
$$0.001 < \||T| - |U|\| < 0.1;$$
and
$$0 \leq \||S| - |T|\| < 0.1,$$

where S represents a value of an inner product of a unit normal vector of the first reflecting surface and a unit normal vector of the second reflecting surface, T represents a value of an inner product of the unit normal vector of the first reflecting surface and a unit normal vector of the third reflecting surface, and U represents a value of an inner product of the unit normal vector of the second reflecting surface and the unit normal vector of the third reflecting surface.

2. The apparatus according to claim 1,
wherein the first and second reflecting surfaces are in contact with each other to form a first ridge line,
wherein the second and third reflecting surfaces are in contact with each other to form a second ridge line, and
wherein the third and first reflecting surfaces are in contact with each other to form a third ridge line.

3. The apparatus according to claim 2,
wherein the first and second ridge lines are not perpendicular to each other, and
wherein the second and third ridge lines are not perpendicular to each other.

4. The apparatus according to claim 2, wherein the third and first ridge lines are perpendicular to each other.

5. The apparatus according to claim 1, wherein the receiving element is provided at a side opposite to the reflecting element with respect to the light source along an optical path of the light flux.

6. A scanning apparatus comprising:
the apparatus of claim 1; and
a deflecting unit configured to deflect the light flux from the light source to scan a scanned surface in a main scanning direction.

7. The scanning apparatus according to claim 6, wherein the light flux deflected in a predetermined direction by the deflecting unit is reflected once by each of the first to third reflecting surfaces.

8. The scanning apparatus according to claim 6, wherein the light flux from the reflecting element is incident on the receiving element after being deflected by the deflecting unit.

9. The scanning apparatus according to claim 6, further comprising a deflecting element configured to deflect the light flux from the reflecting element.

10. The scanning apparatus according to claim 9, wherein an incident surface and an exit surface of the deflecting element are not parallel to each other in the main scanning cross section.

11. The scanning apparatus according to claim 9, further comprising an optical system configured to guide the light flux from the deflecting unit to the scanned surface,
wherein the deflecting element is provided between the deflecting unit and the scanned surface in an optical axis direction of the optical system.

12. The scanning apparatus according to claim 11, wherein the optical system includes an optical element integrated with the deflecting element.

13. The scanning apparatus according to claim 11, wherein the receiving element is provided between the deflecting unit and the scanned surface in the optical axis direction of the optical system.

14. The scanning apparatus according to claim 6, further comprising a controller configured to adjust a light emission timing of the light source based on a timing of light reception by the receiving element.

15. A forming apparatus comprising:
the scanning apparatus of claim 6;
a developing unit configured to develop, as a toner image, an electrostatic latent image formed on the scanned surface by the scanning apparatus;
a transferring unit configured to transfer the developed toner image onto a transferred material; and
a fixing unit configured to fix the transferred toner image on the transferred material.

16. The forming apparatus according to claim 15, wherein the light flux deflected in a predetermined direction by the deflecting unit is reflected once by each of the first to third reflecting surfaces.

17. The forming apparatus according to claim 15, wherein the light flux from the reflecting element is incident on the receiving element after being deflected by the deflecting unit.

18. A forming apparatus comprising:
the light scanning apparatus of claim 6; and
a printer controller configured to convert a signal output from an external apparatus into image data to input the image data to the scanning apparatus.

19. The forming apparatus according to claim 18, wherein the light flux deflected in a predetermined direction by the deflecting unit is reflected once by each of the first to third reflecting surfaces.

20. The forming apparatus according to claim 18, wherein the light flux from the reflecting element is incident on the receiving element after being deflected by the deflecting unit.

* * * * *